Nov. 11, 1930.  S. MADSEN  1,781,467
BEARING MOUNTING
Filed April 25, 1928
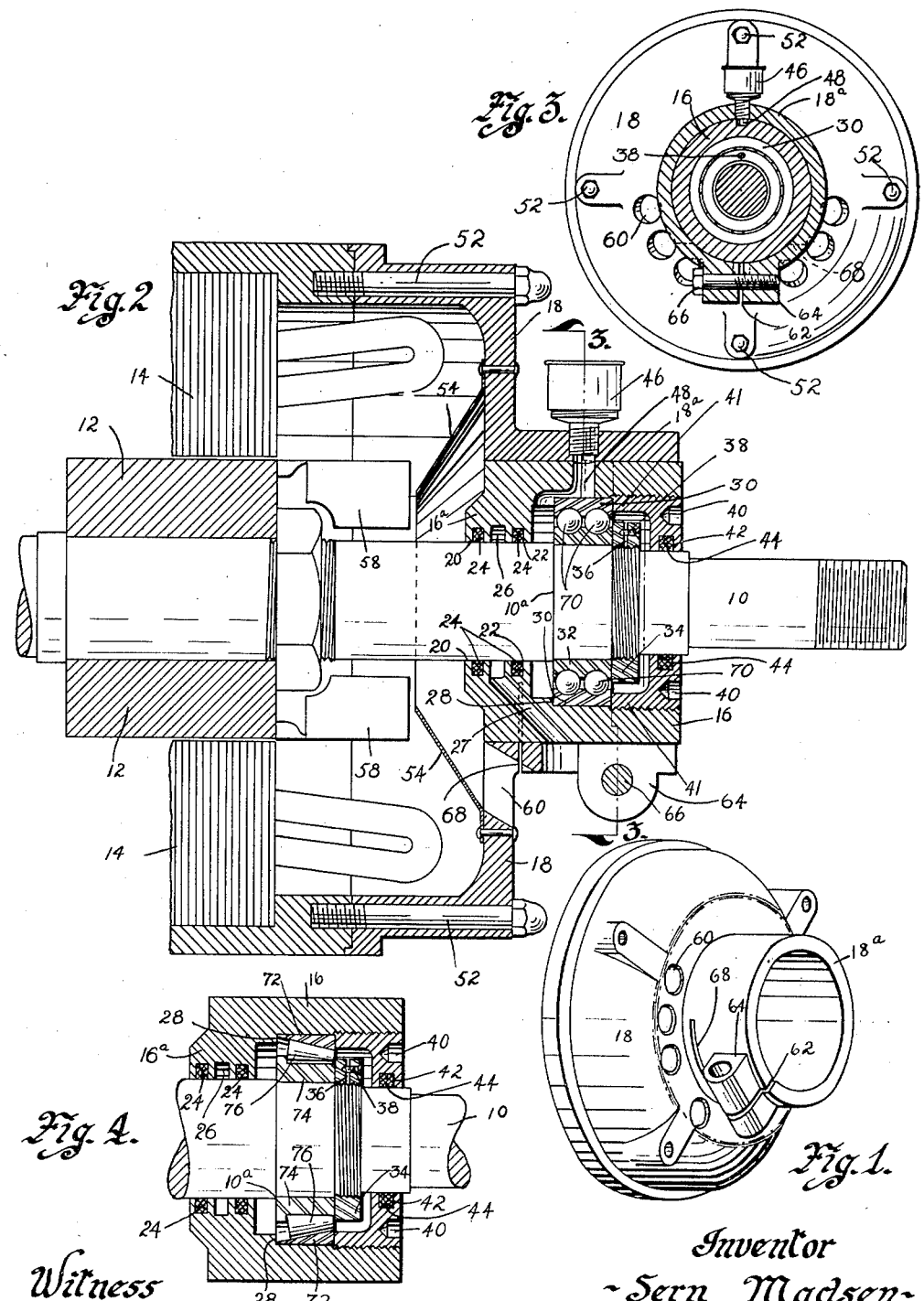

Patented Nov. 11, 1930

1,781,467

UNITED STATES PATENT OFFICE

SERN MADSEN, OF CLINTON, IOWA, ASSIGNOR TO CURTIS COMPANIES, INCORPORATED, OF CLINTON, IOWA

BEARING MOUNTING

Application filed April 25, 1928. Serial No. 272,694.

My invention relates to an improved construction of bearing mounting, which may be used generally in connection with roller or ball bearings, and is particularly adapted for use in mounting anti-friction bearings for electric motors and high speed machine arbors.

It is my object to provide a bearing mounting of very simple and inexpensive construction, peculiarly adapted to be combined with standard parts of an electric motor.

It is also my purpose to provide a bearing mounting wherein may be combined in simple structure a large number of important advantages, including the following:

1. An arrangement whereby the inner race of a ball or roller bearing may be securely but removably locked to a shaft.
2. An arrangement whereby the outer race of such a bearing may be securely but removably locked in a housing for the bearing.
3. A dust and dirt proof chamber for containing the bearings.
4. A structure whereby two bearing races on the same shaft may be readily, easily and quickly aligned and relatively adjusted without any danger of pinching or cramping the bearings.
5. Structure whereby it is possible to insure that each of the bearings of a two bearing motor shall take its share of end thrust, instead of leaving one bearing loose in order to avoid cramping, and thus putting practically all of the end thrust on one bearing.
6. Means for accurately adjusting the bearings with relation to each other to eliminate looseness in the bearings themselves.
7. A structure which permits of the convenient end adjustment of the shaft.
8. An arrangement of parts facilitating the removing of one or both end shields of an electric motor without disturbing the bearings themselves.
9. A construction whereby the rotor of a motor may be removed without disturbing the end shields.
10. A structure permitting the removal of the rotor for inspection and cleaning without disturbing the adjustment of the bearings.
11. An arrangement which permits of the removal of the bearings without disturbing the end shields of the motor casing.
12. An arrangement which permits reversing the pulley end of the motor without the removal of the end shields of the casing.
13. A structure which permits the assembling of the motor without likelihood of cramping the bearings.
14. A construction which affords convenient control of lubrication.

With these and other objects in view, my invention consists in the construction, arrangement and combination of the various parts of my bearing mounting, whereby the objects contemplated are attained, as hereinafter more fully set forth, pointed out in my claims, and illustrated in the accompanying drawings, in which:

Figure 1 is a perspective view of an end shield of a motor of the kind used in my improved bearing mounting.

Figure 2 is a longitudinal, sectional view through a portion of an electric motor equipped with a bearing mounting structure embodying my invention.

Figure 3 is a detail, sectional view taken on the line 3—3 of Figure 2; and

Figure 4 is a reduced, detail, sectional view, similar to that illustrated at the right-hand end of Figure 2, illustrating my bearing mounting used with tapered roller bearings.

In the accompanying drawings, I have used the reference numeral 10 to indicate generally the shaft of an electric motor. The rotor of the motor is indicated generally at 12 and the stator is in part shown at 14.

On the shaft is a housing member 16 and fitted adjacent to the end of the stator and over the housing is an end shield 18.

The housing 16 fits the shaft snugly at its inner end and is designed at its outer portion to receive the bearings hereinafter more fully described.

The inner end portion 16ª of the housing 16, which fits the shaft 10, is provided with spaced grooves 20 and 22 receiving felt rings 24.

Between the grooves 20 and 22 and spaced therefrom, the bore of the portion 16ª is provided with a lubricant groove 26. A drain hole 27 leads from the groove 26 through the housing 16 for the discharge of lubricant, which may get past the center felt ring 24.

Spaced outwardly from the shaft receiving portion 16ᵃ of the housing 16 is an annular shoulder 28 (as shown in Figure 2). Seated against the shoulder 28 is an outer race 30 of a ball bearing. There is also provided an inner race 32, which is held against sliding to the right on the shaft 10 by means of a collar 34 threaded upon the shaft. The collar 34 may be provided with a split 36 for a portion of its circumference, and the portions on the opposite side of the split or the like 36 may be drawn together for locking the collar on the shaft by means of a locking screw 38.

Screwed into the outer end of the housing 16 is an externally, screw-threaded ring 40, having an annular, laterally projecting flange 41 to bear against the outer race 30.

The shaft 10 is provided with an annular shoulder 10ᵃ against which the inner part of the inner race 32 abuts as shown in Figure 2.

The ring 40 has an internal groove 42, which receives a felt ring 44. The ring 44 is for retaining lubricant for the bearings. This lubricant may be supplied in any suitable way as from a grease cup 46 mounted in the portion of the end shield 18 that receives the housing 16, as shown in Figure 2, through a lubricant passage 48 in the housing 16.

The end shield 18, which is generally speaking of ordinary construction, may be secured to the stator 14 by means of screw bolts 52 or the like. It is of such size and shape as to fit the stator, and allow for adequate ventilation space as shown.

The end shield 18 may be provided on its interior with a deflector 54 for increasing air flow by directing air to the center of the fan 58 mounted on the rotor 12.

The end shield 18 may be provided with suitable ventilating holes 60.

That portion of the end shield 18 which receives the housing 16, I have indicated by the numeral 18ᵃ, for convenience in description. It is machined out on the interior with accuracy to receive the housing 16.

The end shield portion 18ᵃ is provided with a longitudinal saw kerf or slot 62 shown in Figure 1, on opposite sides of which are ears 64 to receive the pinch screw 66.

Adjacent to the body of the shield 18, the portion 18ᵃ is provided with a circumferential saw kerf or the like 68.

Since the shield 18 is of somewhat resilient material, the saw kerfs or slots 62 and 68 make it possible to utilize the pinch screw 66 for tightening the portions 18ᵃ of the end shield 18 on the housing 16 for holding the housing 16 in position on the shaft.

It will thus be seen that I have provided a bearing and mounting therefor of relatively simple and inexpensive construction, whereby the advantages heretofore mentioned are conveniently attained.

I have shown my bearing construction at one end only of the shaft, but it will be understood that a similar construction may be employed at the other end thereof.

In assembling, the housings with the bearings therein may be assembled upon the opposite ends of the shaft having the rotor thereon.

The shaft with the parts thus assembled thereon may then be slid into the motor until the rotor is properly adjusted with relation to the stator. The end shields may be assembled on the ends of the motor and bolted in place on the stator frame.

The bearings will then fit accurately between the housing and the shaft, but the housing and the ring 40 may be freely moved endwise on the shaft.

The ring 40 and housing 16 are thus automatically and accurately aligned, and then the portions 18ᵃ of the shields 18 are clamped in place.

It is thus possible to secure perfect alignment of the bearings without any improper strains upon them.

In Figure 4, I have shown a slightly modified form of my invention in which instead of the ball bearing structure heretofore referred to in the description of my invention, utilizing the balls 70, I employ the roller bearings, having the outer race 72, the inner race 74, and the tapered rollers 76.

The structure is otherwise similar to that already explained, end adjustment of the housing providing for taking up wear of the bearings.

In case of some of the advantages now to be again referred to, the importance of my structure is greater where roller bearings are used than where ball bearings are used.

It will be observed that the advantages mentioned heretofore are secured by the structure above explained.

I have provided the shoulder 10ᵃ on the shaft 10 and the collar 34 for securely but removably locking the inner race for either ball or roller bearings to the shaft.

The housing 16 with its shoulder 28 and the ring 40 and the clamping means on the shield 18 afford means for removably but securely locking the outer race in place in the housing, so that when the bolts 52 are screwed into the stator frame, the outer ball race is properly locked in position.

There is provided also a simple dust and dirt proof chamber for the bearings within the housing 16.

On account of the features just explained and the ready adjustment of the housing within the portion 18ᵃ of the shield 18, it is possible to align the inner and outer bearing races accurately and easily on the shaft.

One objection found to many bearing mounts arises from the fact that in them end thrust is not imposed upon both of the bearing races, but upon one only. It will be obvious that the structure here disclosed is such as to cause each of the bearing races to take its share of the end thrust.

In most bearing mounts, one bearing race is loose, so that that race does not take any of the end thrust.

The advantages just mentioned are attained without any danger of pinching or cramping the bearing races.

Sometimes bearings wear between the two races, and thereupon it frequently happens that there is enough play between the inner and outer races to permit end play of the shaft.

With the structure here shown, if there should be such wearing of the races, the clamping portion of the end shield may be loosened and the ring 40 and housing 16 thrust lengthwise on the shaft (which would be toward the left as the parts are illustrated in Figure 2) until the balls or rollers are tight, and the housing can then be again clamped in place.

This advantage is perhaps of more importance where roller bearings are employed, than where ball bearings are used.

It will be also observed that because the whole bearing assembly, including the housing 40 can be moved as a unit on the shaft by simply loosening the clamping device, it is possible to adjust the shaft lengthwise more easily than would otherwise be done.

By loosening the clamp screws 66 and taking out the screw bolts 52, the end shields may be removed without disturbing the bearings or exposing them to dust or dirt.

By loosening the clamp screws 66, the shaft assembly with the rotor thereon can be removed through the end shield without removing it from the stator frame. This, of course, involves the necessity of a design, such that the bore of the portion 18ª of the end shield is of a trifle larger diameter than the maximum, external diameter of the rotor. This is a convenient arrangement for the removal of the rotor for cleaning, repairs or inspection.

The bearings can be taken out after the pinch screws 66 are loosened without removing the end shield.

The whole rotor may be changed end for end with a minimum of disturbance or adjustment of parts.

The whole motor can be dismantled for rewinding without disturbing the bearings thereon, if that should be necessary or desirable.

It is easy to do all of these things without the likelihood of that pinching or cramping of the bearings, which frequently causes trouble with bearing mountings.

It is, of course, probable that changes may be made in the details of the construction and arrangement of the parts of my improved bearing mounting without departing from the real scope of my invention, and it is my intention to cover by the claims of the patent to be issued hereon, any changes in structure, modifications in arrangement or use of mechanical equivalents, which may be reasonably included within the scope of my invention and my claims.

I claim as my invention:

1. In a motor construction, a stator, an end shield thereon having a hub, a shaft through the end shield, a rotor on the shaft within the stator, an opening through said hub large enough to allow introduction of the rotor therethrough, a bearing on said shaft within said hub, a bearing housing filling the space between said bearing and said hub and longitudinally slidable through the hub and means for locking said housing in said hub, said means comprising clamping lugs and a clamping bolt, said hub being longitudinally split between said lugs and a transverse cut through a portion of the hub at a point spaced inward from the clamping bolt.

2. In a motor construction, a stator, an end shield thereon having a hub, a shaft through the end shield, a rotor on the shaft within the stator, a bearing on said shaft within said hub, a bearing housing filling the space between said bearing and said hub and longitudinally slidable through the hub and means for locking said housing in said hub, said means comprising clamping lugs and a clamping bolt, said hub being longitudinally split between said lugs and a transverse cut through a portion of the hub at a point spaced inward from the clamping bolt.

Des Moines, Iowa, April 11, 1928.

SERN MADSEN.